(12) United States Patent
Miller et al.

(10) Patent No.: US 6,517,615 B2
(45) Date of Patent: Feb. 11, 2003

(54) COALESCING FILTER ASSEMBLY

(75) Inventors: Gary Wayne Miller, Livonia, MI (US); Thomas Dean Barker, Novi, MI (US); Garth James Schultz, Oxford, MI (US); Stephen Alan Carter, Mississauga (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 09/779,721

(22) Filed: Feb. 8, 2001

(65) Prior Publication Data

US 2002/0104440 A1 Aug. 8, 2002

(51) Int. Cl.⁷ .......................... B01D 46/00; G05D 16/10
(52) U.S. Cl. .................. 96/421; 55/315; 55/318; 55/322; 55/419; 55/DIG. 17; 137/340; 137/505.25; 137/507
(58) Field of Search ......................... 55/337, 419, 456, 55/DIG. 17, 315, 318, 322; 96/137, 138, 147, 149, 151, 421; 137/340, 505.25, 507

(56) References Cited

U.S. PATENT DOCUMENTS

| | | | | |
|---|---|---|---|---|
| 5,746,791 A | * | 5/1998 | Wang | ..................... 55/DIG. 17 |
| 5,779,772 A | * | 7/1998 | Unger et al. | ................... 96/137 |
| 5,846,271 A | * | 12/1998 | Flynn et al. | ........... 55/DIG. 17 |
| 5,888,259 A | * | 3/1999 | Maeda | ................... 55/DIG. 17 |
| 6,012,485 A | | 1/2000 | Connelly et al. | |
| 6,029,629 A | | 2/2000 | Tipton | |
| 6,041,762 A | | 3/2000 | Sirosh et al. | |
| 6,321,779 B1 | * | 11/2001 | Miller et al. | ................. 137/340 |

\* cited by examiner

*Primary Examiner*—David A. Simmons
*Assistant Examiner*—Minh-Chau T. Pham
(74) *Attorney, Agent, or Firm*—Sean W. Goodwin (57) ABSTRACT

A filter arrangement for use with a vessel containing pressurized fluid includes a body engageable with the vessel. The arrangement further includes a coalescing filter assembly supported by the body such that the filter assembly is disposable inside the vessel when the body is engaged with the vessel. In one embodiment of the filter arrangement, the coalescing filter assembly includes a housing having a cavity, a coalescing filter disposed in the cavity for removing entrained liquid from the fluid, and a drain device in fluid communication with the cavity for draining the liquid removed by the coalescing filter from the cavity into the vessel.

22 Claims, 6 Drawing Sheets

COALESCING FILTER ASSEMBLY

BACKGROUND OF THE INVENTION

1. Field of the Invention

The invention relates to a filter arrangement for use with a vessel containing a pressurized fluid, and the arrangement includes a coalescing filter assembly disposable inside the vessel.

2. Background Art

Coalescing filters are used in automotive applications to remove liquids, such as water and oil, from fuel that is supplied to an engine. Typically, such filters are located downstream of a vessel or cylinder containing compressed fuel, such as natural gas, and upstream of a pressure regulator that regulates pressure of the fuel supplied to the engine. Because of the large pressure differential that may exist between the interior and exterior of the filters, the filters are typically provided with a rather thick-walled filter housing that is costly to manufacture. Because of limited available space, however, the filter housings are usually relatively small. As a result, frequent servicing of the filters is typically required to drain off coalesced liquids.

SUMMARY OF THE INVENTION

The invention addresses the shortcomings of the prior art by providing a filter arrangement including a coalescing filter assembly that may be inexpensively manufactured. Furthermore, the coalescing filter assembly of the invention reduces or eliminates the need for servicing to drain the assembly.

Under the invention, a filter arrangement for use with a vessel containing pressurized fluid includes a body engageable with the vessel. The arrangement further includes a coalescing filter assembly supported by the body such that the filter assembly is disposable inside the vessel when the body is engaged with the vessel.

Because the filter assembly is disposable inside the vessel, the filter assembly is not exposed to significant pressure differentials that may exist between the interior (P1) and exterior of the vessel (P2). Instead the pressure within the filter assembly (P3) will be substantially the same as that of the inside of the vessel (P1), with the exception of a small pressure differential between the inside of the filter (P4) and the body (P3) caused by the flow of the fuel through the filter. As a result, the filter assembly of the,invention may be less costly to manufacture than prior assemblies that must be configured to withstand large pressure differentials.

In one embodiment of the invention, the coalescing filter assembly includes a housing having a cavity, a coalescing filter disposed in the cavity for removing entrained liquid from the fluid, and a drain device in fluid communication with the cavity for draining the liquid removed by the coalescing filter from the cavity into the vessel. The drain device may include, for example, an electrically controlled valve. With such a configuration, the coalescing filter assembly may not require any servicing to drain the cavity.

The filter assembly may also include a particle filter in fluid communication with the cavity and disposed downstream of the cavity. The particle filter may be used to remove particulate from the fluid.

The filter arrangement may also include a supply valve supported by the body and in fluid communication with the coalescing filter assembly. For example, the filter arrangement may include an electrically controlled supply valve connected between the body and the coalescing filter assembly. Advantageously, the supply valve may be used to control the flow of fluid through the coalescing filter assembly.

The filter arrangement may also include valve means or a pressure regulating device disposed in the body, between the outside of the vessel and the coalescing filter. Such a device may be used to regulate outlet pressure of the vessel.

These and other objects, features and advantages of the invention are readily apparent from the following detailed description of the best modes for carrying out the invention, when taken in conjunction with the accompanying drawings.

DETAILED DESCRIPTION OF THE PREFERRED EMBODIMENT(S)

Figure 1:
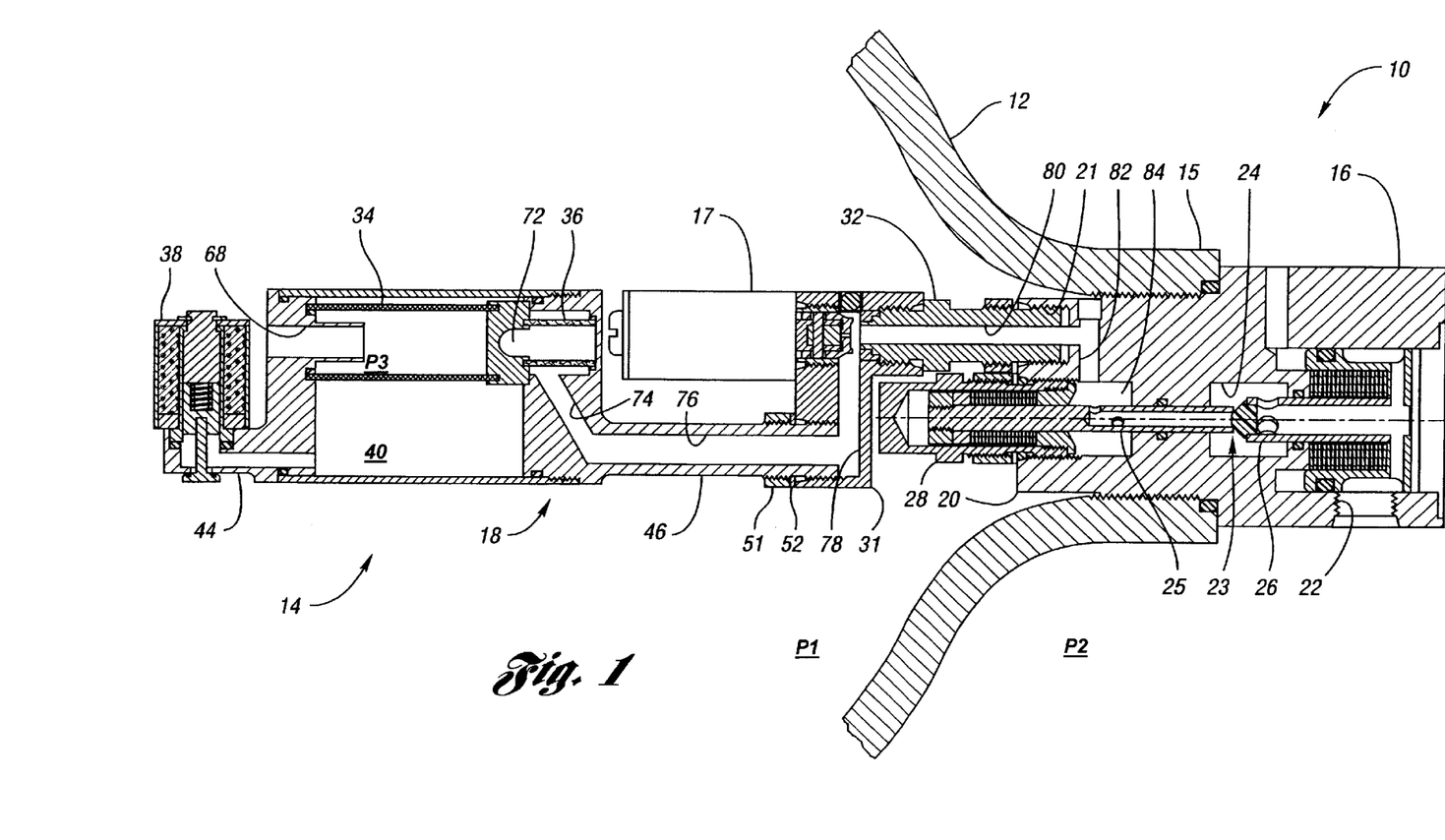
FIG. 1 is a cross-sectional view of a system according to the invention for supplying filtered fluid, and the system includes a cylinder and a coalescing filter arrangement connected to the cylinder.

FIG. 1 shows a system 10 according to the invention for supplying filtered fluid for a particular application. In a preferred embodiment, the system 10 supplies filtered fuel to an engine (not shown) of a vehicle. Alternatively, the system 10 may be used to filter any suitable fluid, such as carbon dioxide, oxygen, or other commercial gases.

The system 10 includes a vessel, such as a tank or cylinder 12, and a coalescing filter arrangement 14 connected to the cylinder 12. The cylinder 12 preferably contains pressurized fuel, such as compressed natural gas, hydrogen, or other fuel, and may be made of any suitable material such as steel, aluminum and/or fiber reinforced plastic. The pressure inside the vessel (P1) is significantly higher than that outside the vessel (P2), creating a large ΔP. The cylinder 12 is also preferably provided with a threaded neck 15.

Figure 2:
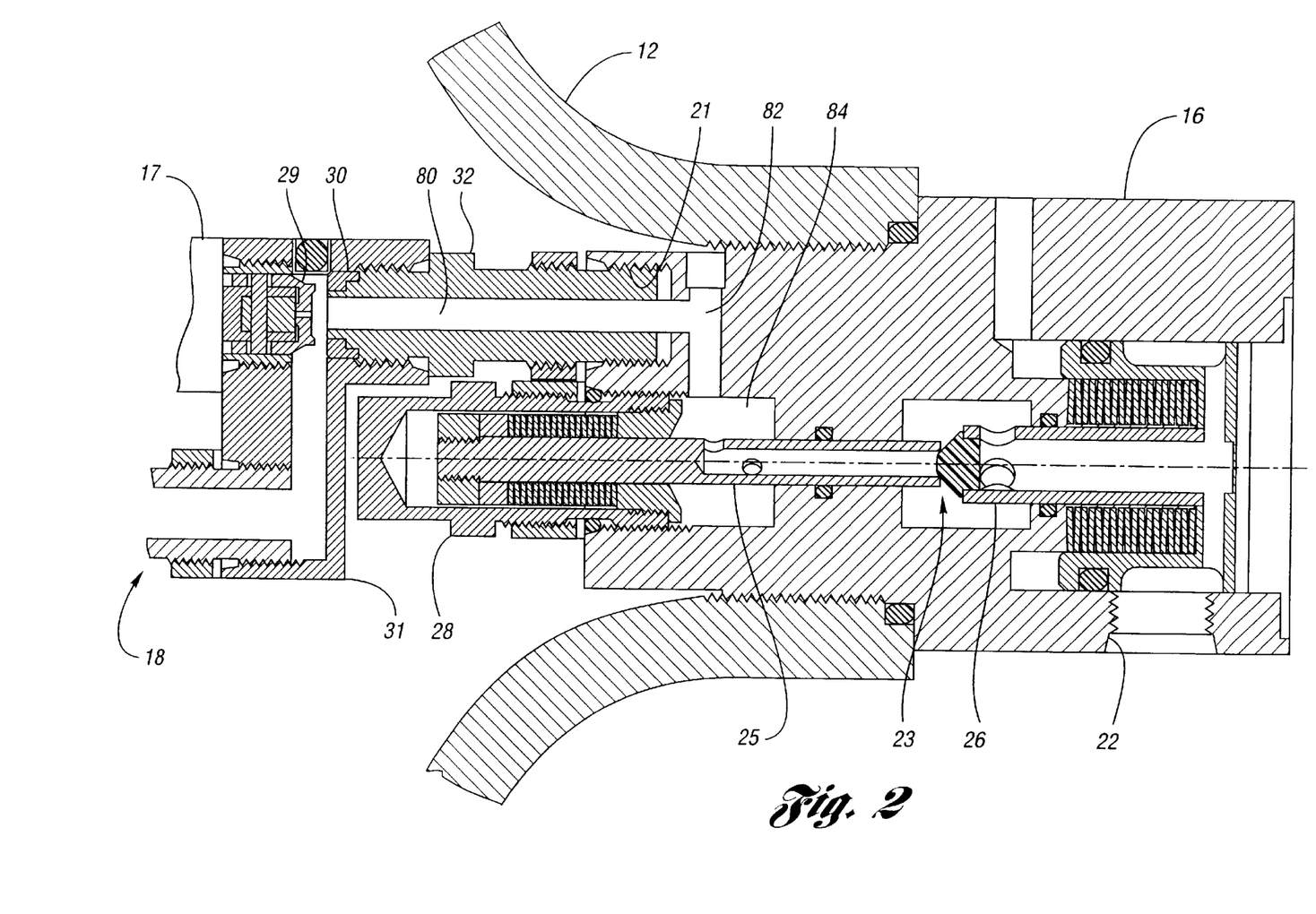
FIG. 2 is an enlarged view of a portion of the filter arrangement showing a pressure regulator connected to the cylinder, and a supply valve connected to the pressure regulator.

The filter arrangement 14 includes valve means, typically a pressure regulator 16, a supply valve 17 connected to the pressure regulator 16, and a coalescing filter assembly 18 connected to the supply valve 17. Referring to FIGS. 1 and 2, the pressure regulator 16 regulates At outlet pressure of the cylinder 12, and has a body 20 threadingly engaged with the neck 15. In addition, the pressure regulator 16 includes an inlet port 21, an outlet port 22, and a pressure regulating device 23 that extends into a pressure regulating chamber 24. While the pressure regulating device 23 may have any suitable configuration and include any suitable components, such as a single piston, in a preferred embodiment the pressure regulating device 23 includes a compensation piston 25 and a main or sensor piston 26. The compensation piston 25 compensates for varying pressure in the cylinder 12, and the sensor piston 26 cooperates with the compensation piston 25 to regulate outlet pressure. The pressure regulator 16 also preferably includes a pressure adjuster 28 for adjusting the outlet pressure. Additional details regarding the pressure regulator 16 are disclosed in co-pending U.S. patent application Ser. No. 09/642,747, which is hereby incorporated by reference in its entirety. Alternatively, in lieu of the pressure regulator 16, the filter arrangement 14 may be provided with any suitable body that is engageable with the cylinder 12, such as a valve body or an end cap.

The supply valve 17 controls flow of fuel from the cylinder 12 into the pressure regulator 16. Preferably, the supply valve 17 is an electrically controlled valve, such as a solenoid-operated valve, that is normally closed. In other words, supply valve 17 is preferably closed when not energized, and open when energized. For example, as shown in FIG. 2, the supply valve 17 may include a first solenoid piston 29 that mates with a seal 30 when the supply valve 17 is de-energized, and moves away from the seal 30 when the supply valve 17 is energized. Furthermore, the supply valve 17 has a base 31 that receives the filter assembly 18, and an adapter 32 for connecting the base 31 to the inlet port 21 of the pressure regulator 16.

Figure 3:
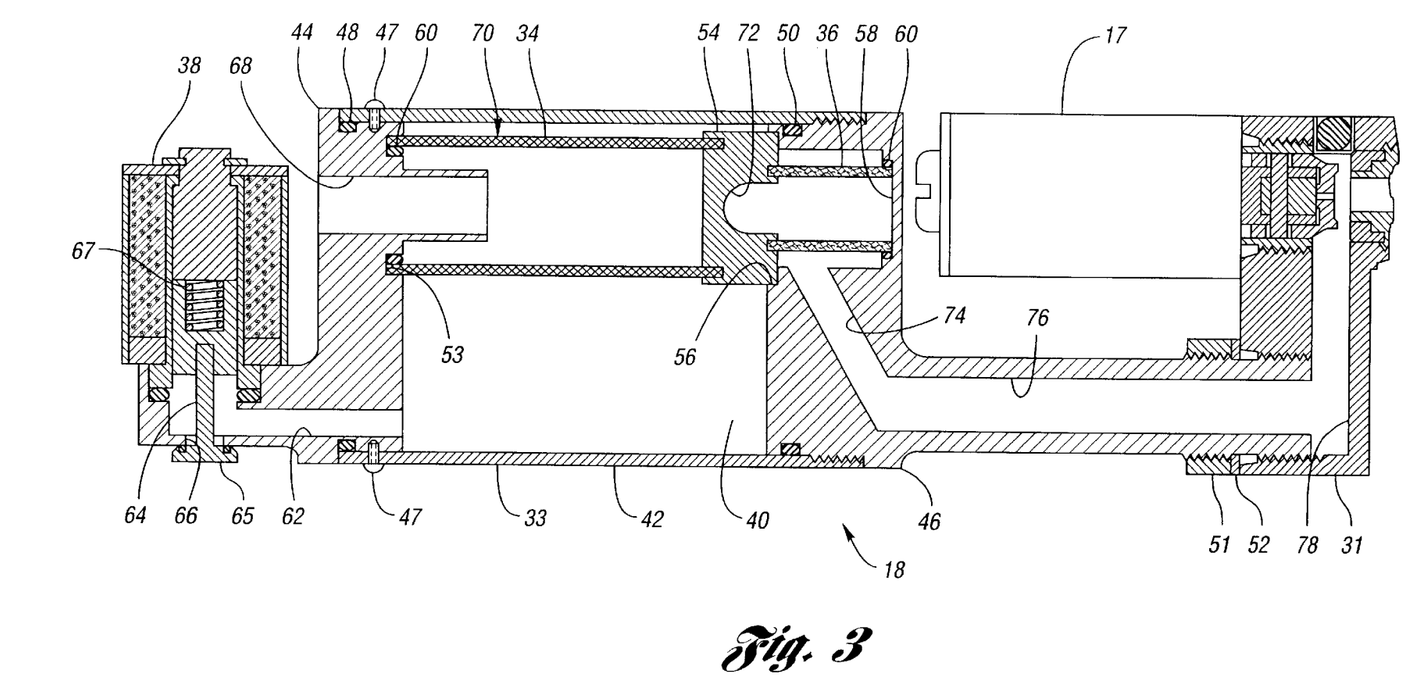
FIG. 3 is an enlarged view of another portion of the filter arrangement showing a coalescing filter assembly connected to the supply valve.

Referring to FIGS. 1 and 3, the filter assembly 18 includes a housing 33 connected to the base 31, a coalescing filter 34 and a particle filter 36 disposed in the housing 33, and a drain device 38 connected to the housing 33. The housing 33 defines a cavity 40 for receiving the coalescing filter 34, and includes a filter enclosure 42 connected between an inlet body 44 and an outlet body 46.

Because the filter assembly 18 is disposed inside the cylinder 12 when the pressure regulator 16 is connected to the cylinder 12, the filter enclosure 42 is not exposed to any significant pressure differential. As a result, the filter enclosure 42 may be configured as a relatively thin walled, low-cost structure. For example, the filter enclosure 42 may be configured as a cylinder having a wall thickness in the range of 0.035 to 0.109 inches.

The filter enclosure 42 may be connected to the inlet and outlet bodies 44 and 46, respectively, in any suitable manner such as by fastening, staking, welding, gluing and/or press fitting the filter enclosure 42 to the bodies 44 and 46. For illustrative purposes, the filter enclosure 42 is shown press fit to the inlet body 44, and threadingly engaged with the outlet body 46. Fasteners 47 may also be used to further secure the filter enclosure 42 to the inlet body 44. First and second seals 48 and 50, respectively, are provided to seal the connections between the filter enclosure 42 and the inlet and outlet bodies 44 and 46, respectively.

The outlet body 46 is also preferably threadingly engaged with the base 31 so as to secure the filter assembly 18 to the supply valve 17. A jam nut 51 and jam washer 52 may also be provided for securing the outlet body 46 to the base 31 after the outlet body 46 has been properly oriented with respect to the base 31.

The inlet and outlet bodies 44 and 46, respectively, also preferably support the coalescing filter 34 and the particle filter 36. As shown in FIG. 3, one end of the coalescing filter 34 is disposed in an annular cavity 53 of the inlet body 44. The other end of the coalescing filter 34 is engaged with an end cap 54, which is seated in a first recess 56 of the outlet body 46. Similarly, one end of the particle filter 36 is engaged with the end cap 54, and the other end is seated in a second recess 58 of the outlet body 46. Seals, such as O-rings 60, ay also be provided between the coalescing filter 34 and the inlet body 44, and between the particle filter 36 and the outlet body 46. Alternatively, the filters 34 and 36 may be supported by the housing 33 in any suitable manner.

The coalescing filter 34 functions to remove liquids, such as oil and/or water, from the fuel prior to the fuel entering the pressure regulator 16, as explained below in greater detail. The coalescing filter 34 preferably has a cylindrical shape, and comprises a borocilicate microglass coalescing layer sandwiched between inner and outer layers of rayon or fiberglass impregnated with phenolic resin. Alternatively, the coalescing filter 34 may have any suitable configuration and comprise any suitable material or materials.

The particle filter 36 functions to remove particles, such as dirt and/or metal particles, from the fuel after the fuel has passed through the coalescing filter 34. Alternatively, the particle filter 36 may be disposed upstream of the coalescing filter 34. While the particle filter 36 may have any suitable configuration, the particle filter 36 preferably has a cylindrical shape. Furthermore, the particle filter 36 may comprise any suitable material, such as sintered brass, sintered steel, or wire cloth.

The drain device 38 is threadingly connected to the inlet body 44, and is in fluid communication with the cavity 40 via drain passage 62, which is formed in the inlet body 44. Advantageously, the drain device 38 functions to drain liquid removed from the fuel back into the cylinder 12. In one embodiment of the invention, the drain device 38 is an electrically controlled valve, such as a solenoid-operated valve, that closes when energized and opens when de-energized. For example, the drain device 38 may include a second solenoid piston 64 having an enlarged end 65 that mates with inlet body 44 when the drain device 38 is energized, so as to close orifice 66 formed in the inlet body 44. When the drain device 38 is de-energized, the enlarged end 65 is forced away from the inlet body 44 by return spring 67, thereby opening the orifice 66. With such a configuration, when no power is being provided to the drain device 38, the drain device 38 will allow liquid to drain from the cavity 40 into the cylinder 12. Preferably, the drain device 38 is open whenever the engine is shut off, and is closed whenever the supply valve 17 is open.

Alternatively, the drain device 38 may comprise any suitable drain mechanism. For example, the drain device 38 may be a mechanical valve that opens when there is no flow-induced pressure differential between the interior of the cylinder 12 and the interior of the drain device 38, and closes when there is a flow-induced pressure differential. Such a mechanical valve may include a spring, similar to return spring 67, that is appropriately configured so as to open the valve when there is no flow of fuel out of the cylinder 12.

With reference to FIGS. 1–3, operation of the system 10 will now be described. When the supply valve 17 and drain device 38 are energized, fuel may flow through the filter arrangement 14. First, fuel will pass through an inlet passage 68 formed in the inlet body 44, and into the interior of the coalescing filter 34. The fuel then flows through the coalescing filter 34 and into cavity 40. As the fuel flows through the coalescing filter 34, entrained liquids coalesce on an exterior surface 70 of the coalescing filter 34, thereby forming droplets. These droplets drip off of the surface 70 and fall to the bottom of cavity 40.

Next, the fuel flows through a passage 72 formed in end cap 54, and into the interior of particle filter 36, the fuel then flows through the particle filter 36 and into passages 74 and 76 formed in outlet body 46. Next, the fuel flows through passage 78 formed in base 31, and into passage 80 formed in the adapter 32. From passage 80, the fuel flows through passage 82 formed in the pressure regulator 16, and into cavity 84, which surrounds compensation piston 25. The fuel then flows through compensation piston 25 to sensor piston 26. Next, fuel at a desired regulated pressure flows through the sensor piston 26 and out outlet port 22.

When the supply valve 17 is de-energized, first solenoid piston 29 will seat against seal 30 and prevent fuel from flowing into passage 80. Consequently, the flow of fuel through the filter arrangement 14 will cease. Furthermore, when the drain device 38 is de-energized, return spring 67 will move second solenoid piston 64 downwardly, thereby opening orifice 66. Accumulated liquids in the cavity 40 may then drain through the drain passage 62, out orifice 66, and back into the cylinder 12. Advantageously, then, the filter assembly 18 may not require servicing to empty the cavity 40.

Figure 4:
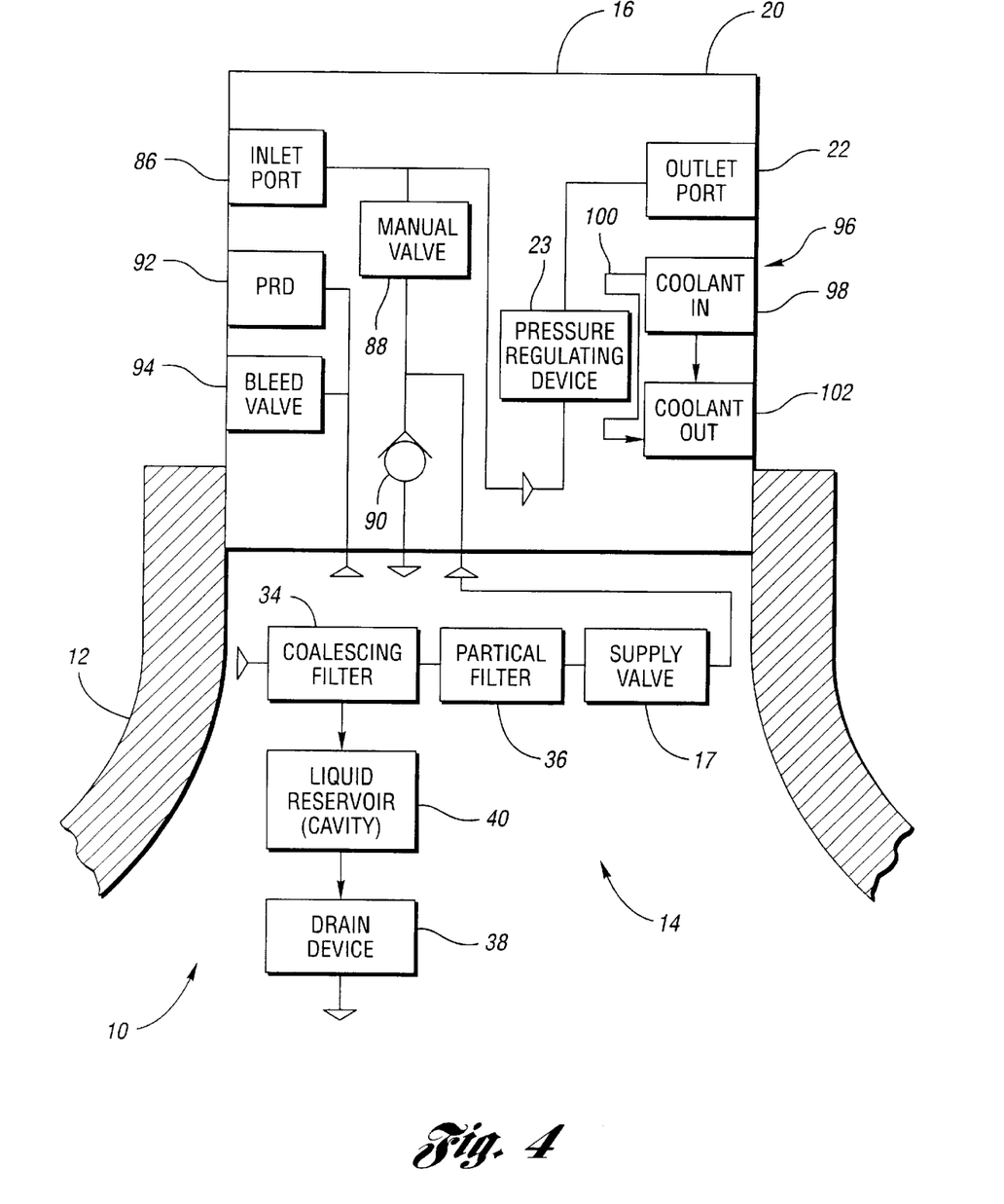
FIG. 4 is a schematic diagram of the system of FIG. 1.

FIG. 4 is a schematic diagram of the system 10 showing additional features that may be included in the system 10. For example, the pressure regulator 16 also preferably includes a high-pressure inlet port 86 that may be used to fill the cylinder 12, or to connect the cylinder 12 to one or more additional fluid sources such as vessels or cylinders containing fuel. During a filling operation, fuel passes from the inlet port 86 through a manual shutoff valve 88 and a check valve 90, and into the cylinder 12. If one or more additional cylinders are connected to the cylinder 12, the shutoff valve 88 may be closed so as to route fuel from the inlet port 86 to the pressure regulating device 23.

The pressure regulator 16 may also be provided with a thermally activated pressure relief device 92, a bleed valve 94 that allows the cylinder 12 to be emptied in case the supply valve 17 fails, and a heating fluid circuit 96 for routing heating fluid, such as engine coolant, through the body 20. The heating fluid circuit 96 may include, for example, a coolant inlet port 98, a coolant passage 100, and a coolant outlet port 102.

Figure 5:
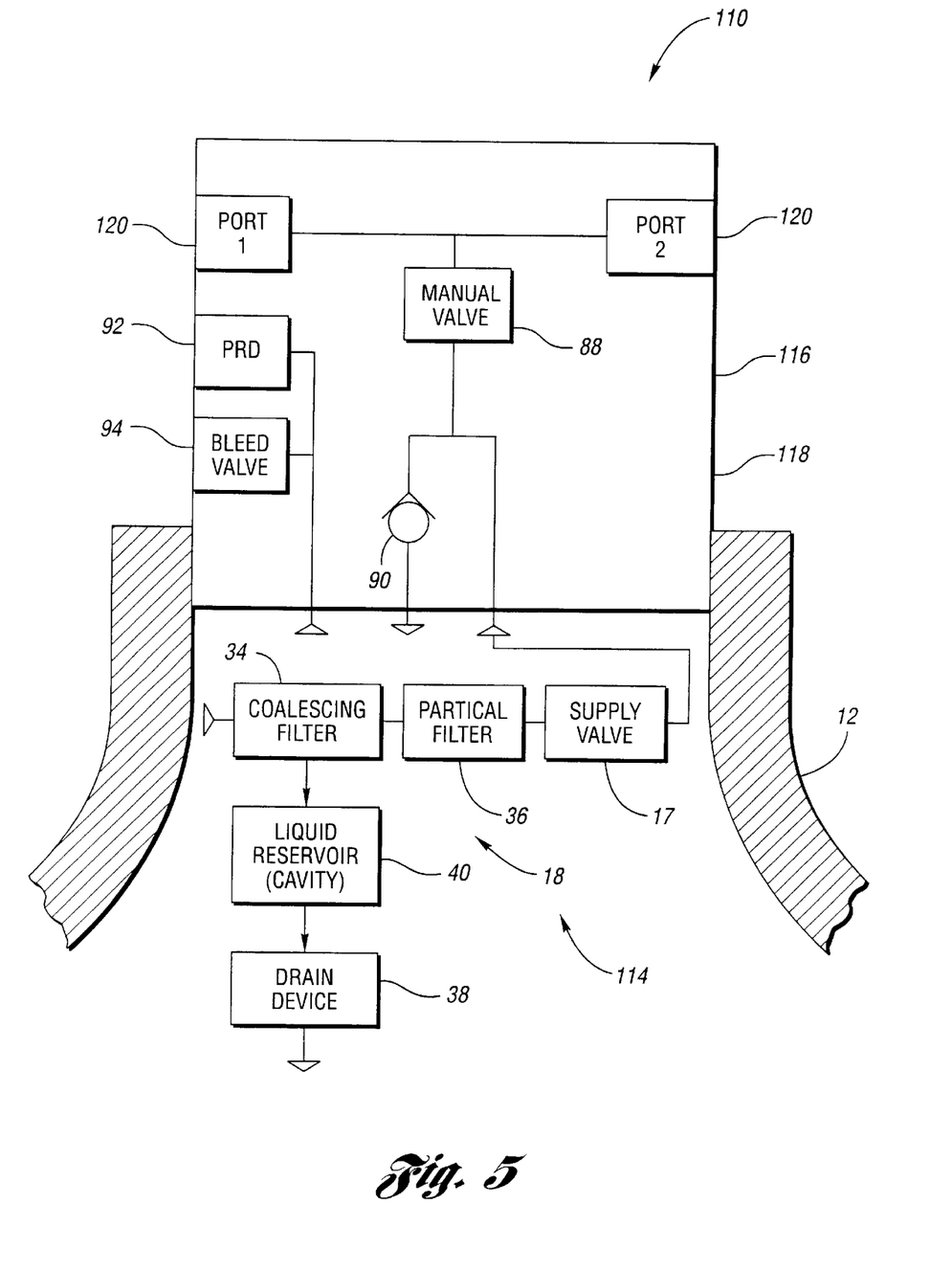
FIG. 5 is a schematic diagram of a second embodiment of the system according to the invention.

FIG. 5 is a schematic diagram of a second embodiment 110 of the system according to the invention. The system 110 includes a vessel, such as cylinder 12, and a coalescing filter arrangement 114 connected to the cylinder 12. The filter arrangement 114 is similar to the filter arrangement 14 described above, except that the filter arrangement 114 is provided with a cylinder valve 116 as valve means in lieu of the pressure regulator 16. The cylinder valve 116 includes a valve body 118 threadingly engaged with the cylinder 12, and two high pressure ports 120 formed in the valve body 118. Each port 120 may function as an inlet portor an outlet port. Furthermore, the ports 120 are preferably opposite each other so as to minimize flow losses.

The cylinder valve 116 also preferably includes shutoff valve 88, check valve 90, pressure relief device 92 and bleed valve 94, such as described above with respect to the system 10. Furthermore, the filter arrangement 114 includes the additional components described above with respect to the filter arrangement 14. For example, the filter arrangement 114 includes supply valve 17 connected to the cylinder valve 116, and coalescing filter assembly 18 connected to the supply valve 17.

Figure 6:
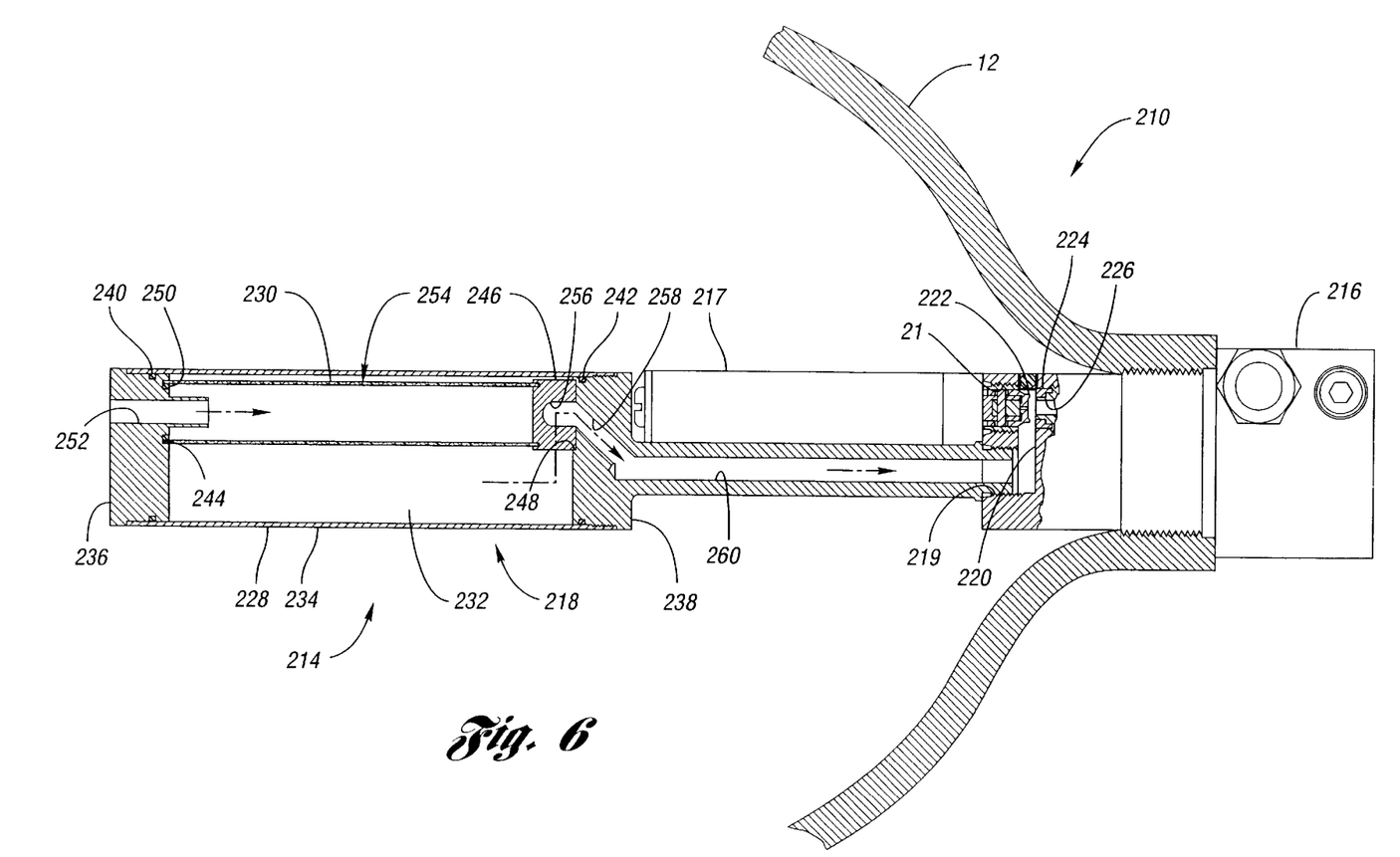
FIG. 6 is a side view, partially in section, of third embodiment of the system according to the invention.

FIG. 6 shows a third embodiment 210 of the system according to the invention. The system 210 includes a vessel, such as cylinder 12, and a coalescing filter arrangement 214 connected to the cylinder 12. The filter arrangement 214 includes a pressure regulator 216, a supply valve 217 connected to the pressure regulator 216, and a coalescing filter assembly 218 connected to the pressure regulator 216.

The pressure regulator 216 is similar to the pressure regulator 16 of the system 10, and includes all of the features of the pressure regulator 16. In addition, the pressure regulator 216 includes an additional inlet port 219 and an additional passage 220 extending between inlet port 219 and inlet port 21. Alternatively, in lieu of the pressure regulator 216, the filter arrangement 214 may be provided with any suitable body that is engageable with the cylinder 12, such as a valve body or an end cap.

The supply valve 217 is similar to the supply valve 17, and is connected to the inlet port 21. Preferably, the supply valve 217 is an electrically controlled valve, such as a solenoid-operated valve, that is normally closed. In the embodiment shown in FIG. 6, the supply valve 217 includes a first solenoid piston 222 that mates with a seal 224 when the supply valve 217 is de-energized, and moves away from the seal 224 when the supply valve 217. In the embodiment shown in FIG. 6, the seal 224 is disposed about a passage 226 formed in the pressure regulator 216.

Similar to the filter assembly 18, the filter assembly 218 includes a housing 228 and a coalescing filter 230. While the filter assembly 218 may also include a particle filter and a drain device, in the embodiment shown in FIG. 6, the filter assembly 218 is provided without either a particle filter or a drain device.

The housing 228 preferably defines a cavity 232 that is larger than the cavity 40, so as to provide additional space for collecting filtered liquid. In the embodiment shown in FIG. 6, the cavity 232 preferably has a length in the range of 4.5 to 7.5 inches, and a diameter in the range of 1.65 to 1.85 inches for a nominal two-inch interior diameter neck opening of the cylinder 12. Alternatively, the cavity 232 may have any suitable size.

The housing 228 also includes a filter enclosure 234 connected between an inlet body 236 and an outlet body 238, which, in turn, is connected to the inlet port 219 of the pressure regulator 216. The filter enclosure 234 may be connected to the bodies 236 and 238 in any suitable manner, such as described above with respect to the filter assembly 18. First and second seals, such as first and second O-rings 240 and 242, respectively, are also preferably provided to seal the connections between the filter enclosure 234 and the inlet and outlet bodies 236 and 238, respectively.

Because the filter assembly 218 is disposed inside the cylinder 12 when the pressure regulator 216 is connected to the cylinder 12, the filter enclosure 234 is not exposed to any significant pressure differential. As a result, the filter enclosure 234 may be configured as a relatively thin-walled, low-cost structure. For example, the filter enclosure 234 may be configured as a cylinder having a wall thickness in the range of 0.035 to 0.109 inches.

Similar to the filter assembly 18, the inlet and outlet bodies 236 and 238, respectively, of the filter assembly 218 also preferably support the coalescing filter 230. For example, one end of the coalescing filter 230 may be disposed in an annular cavity 244 of the inlet body 236. The other end of the coalescing filter 230 may be engaged with an end cap 246, which is preferably seated in a first recess 248 of the outlet body 238. One or more seals may also be provided to seal the connections between the coalescing filter 230 and the inlet and outlet bodies 236 and 238, respectively. In the embodiment shown in FIG. 6, for example, an O-ring 250 is disposed between the coalescing filter 230 and the inlet body 236. Alternatively, the coalescing filters 230 may be supported by the housing 228 in any suitable manner.

Similar to the coalescing filter 34, the coalescing filter 230 functions to remove liquids, such as oil and/or water, from the fuel prior to the fuel entering the pressure regulator 216, as explained below in greater detail. The coalescing filter 230 preferably has a cylindrical shape, and comprises a borocilicate microglass coalescing layer sandwiched between inner and outer layers of rayon or fiberglass impregnated with phenolic resin. Alternatively, the coalescing filter 230 may have any suitable configuration and comprise any suitable materials.

Operation of the system 210 will now be described. When the supply valve 217 is energized, fuel may flow through the filter arrangement 214. First, fuel will pass through an inlet passage 252 formed in the inlet body 236, and into the interior of the coalescing filter 230. The fuel then flows through the coalescing filter 230 and into cavity 232. As the fuel flows through the coalescing filter 230, entrained liquids coalesce on an exterior surface 254 of the coalescing filter 230, thereby forming droplets. These droplets drip off of the surface 254 and fall to the bottom of cavity 232.

Next, the fuel flows through a passage 256 formed in end cap 246, and into passages 258 and 260 formed in outlet body 238. The fuel then flows through passage 220 and into passage 226. From passage 226, the fuel is routed through pressure regulator 216 in a manner similar to that described with respect to the system 10.

When the supply valve 217 is de-energized, first solenoid piston 222 will seat against seal 224 and prevent fuel from flowing into passage 226. Consequently, the flow of fuel through the filter arrangement 214 will cease.

Because the cavity 232 is relatively large, useful life of the filter assembly 218 is increased. As a result, the need for servicing the filter assembly 218 to drain the cavity 232 is reduced.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A filter arrangement for use with a vessel containing pressurized fluid, the arrangement comprising:
   a body engageable with the vessel, the vessel having a pressure differential between an inside of the vessel and an outside of the vessel;
   a coalescing filter assembly for removing entrained liquid from the pressurized fuel, having a housing defining a cavity for supporting a coalescing filter and supported by the body such that the coalescing filter assembly is disposed inside the vessel when the body is engaged with the vessel, the coalescing filter assembly having substantially the same pressure as the inside of the vessel; and
   valve means positioned between the outside of the vessel and the coalescing filter assembly for maintaining the pressure differential between the inside of the vessel and the outside of the vessel.

2. The filter arrangement of claim 1 further comprising a drain device in fluid communication with the cavity for draining the liquid removed by the coalescing filter from the cavity into the vessel.

3. The filter arrangement of claim 2 wherein the drain device further comprises an electrically controlled valve.

4. The filter arrangement of claim 2 wherein the coalescing filter assembly further comprises a particle filter in fluid communication with the cavity.

5. The filter arrangement of claim 1 further comprising a supply valve supported by the body, the supply valve being in fluid communication with the coalescing filter assembly for controlling fluid passage through the filter assembly.

6. The filter arrangement of claim 5 wherein the supply valve is connected between the body and the coalescing filter assembly.

7. The filter arrangement of claim 5 wherein the supply valve is an electrically controlled valve.

8. The filter arrangement of claim 1 wherein the valve means for maintaining the pressure differential between the inside and the outside of the vessel is a pressure regulator.

9. The filter arrangement of claim 8 wherein:
   the pressure regulator has a body threadingly engageable with the vessel; and
   the coalescing filter assembly is supported by the body such that the filter assembly is disposed inside the vessel when the body is engaged with the vessel, the filter assembly being positioned between the pressure regulator and the inside of the vessel and including a housing having a cavity and a coalescing filter disposed in the cavity for removing entrained liquid from the fluid.

10. A system for removing entrained liquids from fluid, the system comprising:
    a vessel containing a pressurized fluid and having a pressure differential between an inside of the vessel and an outside of the vessel;
    a body engaged with the vessel;
    a coalescing filter assembly having a housing defining a cavity for supporting a coalescing filter and supported by the body such that the coalescing filter assembly is disposed inside the vessel, the coalescing filter assembly having substantially the same pressure as the inside of the vessel; and
    valve means located between the outside of the vessel and the coalescing filter assembly for maintaining the pressure differential between the inside and the outside of the vessel.

11. The system of claim 10 further comprising a drain device in fluid communication with the cavity for draining liquid removed by the coalescing filter from the cavity into the vessel.

12. The system of claim 11 wherein the drain device further comprises an electrically controlled valve.

13. The system of claim 11 wherein the coalescing filter assembly further comprises a particle filter in fluid communication with the cavity.

14. The system of claim 10 further comprising a supply valve supported by the body, the supply valve being in fluid communication with the coalescing filter assembly for controlling fluid passage through the filter assembly.

15. The system of claim 14 wherein the supply valve is connected between the body and the coalescing filter assembly.

16. The system of claim 14 wherein the supply valve is an electrically controlled valve.

17. The system of claim 10 wherein the valve means for maintaining the pressure differential between the inside and the outside of the vessel is a pressure regulator.

18. A system for supplying fuel to an engine, the system comprising:
    a vessel containing pressurized fuel;
    a pressure regulator engaged with the vessel for maintaining a pressure differential between an inside and an outside of the vessel; and a coalescing filter assembly disposed inside the vessel between the pressure regulator and the inside of the vessel and the coalescing filter assembly having substantially the same pressure as the inside of the vessel, and having:
- a housing defining a cavity; and
- a coalescing filter disposed in the cavity for removing entrained liquid from the fuel.

19. The filter arrangement of claim 1 wherein the valve means for maintaining the pressure differential between the inside and the outside of the vessel is a cylinder valve.

20. A filter arrangement as described in claim 9 further comprising a drain device in fluid communication with the cavity for draining the liquid removed by the coalescing filter from the cavity into the vessel.

21. The system of claim 10 wherein the valve means for maintaining the pressure differential between the inside and the outside of the vessel is a cylinder valve.

22. The system for supplying fuel to an engine as described in claim 18 further comprising a drain device in fluid communication with the cavity for draining liquid removed by the coalescing filter from the cavity into the vessel.

* * * * *